United States Patent [19]

Iwatsuka et al.

[11] Patent Number: 5,359,689
[45] Date of Patent: Oct. 25, 1994

[54] OPTICAL FIBER TERMINAL FITTED WITH OPTICAL ISOLATOR AND METHOD OF ASSEMBLING THE SAME

[75] Inventors: Shinji Iwatsuka, Shirasato; Kenjiro Hata, Ichikawa; Masaaki Kobayashi, Tokyo, all of Japan

[73] Assignee: TDK Corporation, Tokyo, Japan

[21] Appl. No.: 96,527

[22] Filed: Jul. 22, 1993

[30] Foreign Application Priority Data

Jul. 24, 1992 [JP] Japan ................ 4-217430
Feb. 19, 1993 [JP] Japan ................ 5-053158

[51] Int. Cl.$^5$ .............................................. G02B 6/36
[52] U.S. Cl. ........................................ 385/73; 385/33
[58] Field of Search ................ 385/73, 31, 33, 53, 385/76, 78, 88, 92, 93, 94, 27; 359/484, 282, 280, 900; 372/703

[56] References Cited

U.S. PATENT DOCUMENTS 4,878,731 11/1989 Caron et al. .................... 385/27
5,040,863 8/1991 Kawakami et al. ............. 385/31
5,121,451 6/1992 Grard et al. .................... 385/33

FOREIGN PATENT DOCUMENTS

431821 2/1992 Japan .

Primary Examiner—Rodney B. Bovernick
Assistant Examiner—John Ngo
Attorney, Agent, or Firm—Panitch Schwarze Jacobs & Nadel

[57] ABSTRACT

An optical fiber terminal fitted with an optical isolator comprises an optical fiber, a ferrule which holds the optical fiber in position, and an optical isolator which includes an optical isolator assembly having at least one magneto-optical element and at least one polarizer and means for applying a magnetic field of less than saturation to the magneto-optical element. The fiber, ferrule, and isolator are disposed close to one another and joined integrally. The optical isolator has a maximum outside diameter not more than twice, preferably substantially equal to, the outside diameter of the ferrule.

15 Claims, 6 Drawing Sheets

OPTICAL FIBER TERMINAL FITTED WITH OPTICAL ISOLATOR AND METHOD OF ASSEMBLING THE SAME

BACKGROUND OF THE INVENTION

This invention relates to improvements in an unsaturated type optical isolator for applying an undersaturated magnetic field to magneto-optical elements, and more specifically to an optical fiber terminal fitted with a small optical isolator for such applications as semiconductor laser modules and optical amplifiers.

Figure 2:
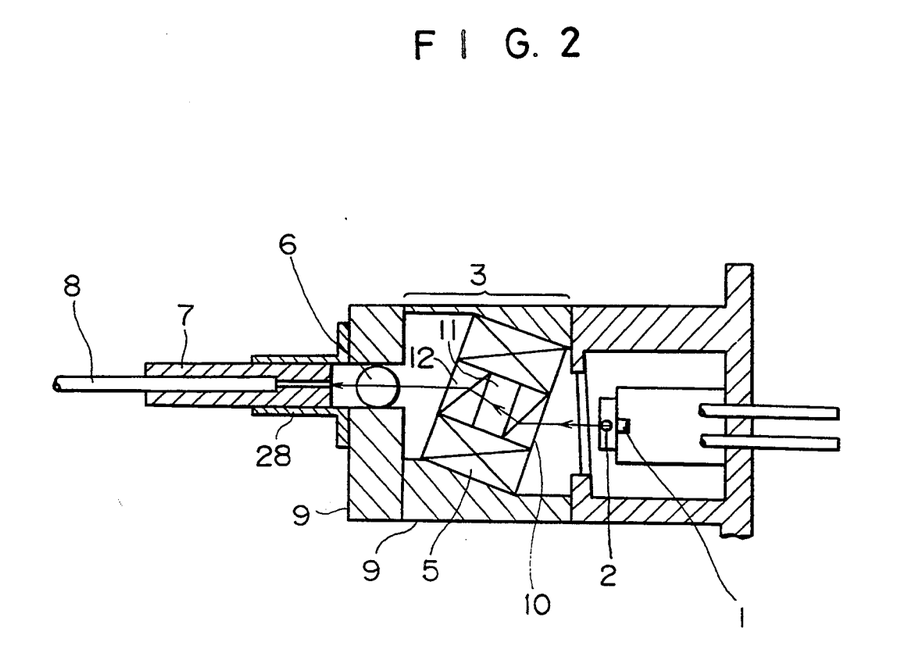
FIG. 2 is a sectional view of a laser module using a conventional optical isolator.

Optical isolators are used in optical amplifiers, semiconductor laser modules, and the like. For example, a semiconductor laser module, as diagrammatically shown in FIG. 2, comprises a laser diode 1, primary lens 2, optical isolator 3 (which consists of a polarizer 10, a magneto-optical element 11 which functions as a Faraday rotator, a polarizer 12, and a magnet 5), secondary lens 6, ferrule 7, and an optical fiber 8 supported by the ferrule. Rays of light emitted by the laser diode 1 are made parallel by the primary lens 2 and, after passage through the optical isolator 3, focused by the secondary lens 6 at one end of the optical fiber 8. Return light in the reverse direction is shut off by the optical isolator 3 so as not to reach the laser diode 1. In this conventional arrangement the optical isolator 3 is accommodated in a housing 9' and the optical fiber 8 is fixed in position by welding the ferrule 7 that holds it into a slide ring 28 and welding the ring, in turn, to a lens holder 9 of the secondary lens 6.

An unsaturated optical isolator (a magnetic garnet as a magneto-optical element to which a magnetic field short of saturation is applied), as introduced by the present inventors in Japanese Patent Application Public Disclosure No. Hei 4-31821, exhibits outstanding temperature properties. However, that isolator has the disadvantage of large size that is necessitated by the use of a sufficiently large magnet to ensure uniform magnetic field distribution, since otherwise the magnetic field makes the angle of Faraday rotation variable. In an effort to overcome the disadvantage, Patent Application No. Hei 3-354071 proposed a new construction which permits some size reduction. Briefly stated, the proposed optical isolator comprises a cylindrical magnet whose direction of magnetization is axial, a soft-magnetic sleeve in the form of a cylinder disposed around the magnet substantially in contact with it, an annular magnetic yoke located at an open end of the cylindrical magnet, away from the cylindrical soft-magnetic yoke, and a magneto-optical element disposed inside the cylindrical magnet. The adoption of a soft-magnetic outer sleeve renders the magnetic field inside the cylindrical magnet less susceptible to external magnetic fields. Also, designing the magnet so that its geometry desirably satisfies the relation, length/inside diameter=0.5 outside diameter/inside diameter+(0.03~0.26) ensures the uniformity of the magnetic field that is applied to the magneto-optical element located inside the magnet. The isolator thus is suited for use with an unsaturated Faraday rotator with good temperature stability. Further, the magnetic field can be adjusted to any desired set value through the adjustments of the dimensions, especially the thickness, of the magnetic yoke. These simplify the process. Contrary to the common knowledge in the art with an arrangement in which the magnet is in contact or substantially in contact with the soft-magnetic sleeve, the intensity of the center magnetic field in the bore of the magnet does not decrease appreciably because the magnetic yoke is not in contact with the soft-magnetic sleeve. Still, the optical isolator of the construction described is unable to achieve satisfactory size reduction.

In order to keep the characteristics of an unsaturated optical isolator unchanged with dispersions in the position of incoming light and also in beam diameter, it is inevitable to increase the size of the isolator. However, the isolator must nevertheless be reduced in size to overcome the foregoing problem.

The characteristics of an optical isolator must be kept constant because the point of light incidence upon the isolator and the beam diameter are both variable. For example, in a conventional arrangement shown in FIG. 2, dispersions of dimensions of the component members can cause changes in the position of light that comes into and out of the optical isolator and also in the diameter of the light beam. The optical isolator is thus required to maintain its characteristics unaffected even by slight changes in the light incidence position and in the beam diameter.

BRIEF SUMMARY OF THE INVENTION

The present invention provides an optical fiber terminal fitted with an optical isolator characterized in that an optical fiber, a ferrule which holds the optical fiber in position, and an optical isolator of unsaturated type which comprises an optical isolator assembly (including at least one magneto-optical element and at least one polarizer, sometimes combined with another optical component or components) located at the end of the optical fiber and means for applying a magnetic field of less than that for saturation to the magneto-optical element are joined integrally and that the optical isolator has a maximum outside diameter either substantially equal to, or not more than twice, the outside diameter of the ferrule.

DETAILED DESCRIPTION OF THE INVENTION

When an optical isolator of unsaturated type is integrally joined to an optical fiber in accordance with the invention, the position of light incident upon the optical isolation element that forms a part of the optical isolator and the diameter of the light beam are fixed. There is no longer the need of considering the uniformity of magnetic field and other characteristics that is necessary in the prior art. Thus the unsaturated type optical isolator can be satisfactorily reduced in size. Also, because the isolator according to the invention differs little in outside diameter from the ferrule on the optical fiber, the optical fiber fitted with this optical isolator can be handled like an optical fiber not fitted with it when being incorporated into a semiconductor laser module, optical amplifier or the like. It is only necessary to insert the optical fiber terminal fitted with the optical isolator into the body of a host system, have the ferrule held by a suitable ferrule holder, and, after desired adjustments, fix it in position by welding or other means. The assembling is simplified because it requires no such conventional assembling procedure nor the adjustments among the optical fiber, polarizer, and magneto-optical element.

After the integral assembling, the characteristics of the assembly are optimized for the service conditions (wavelength and temperature). This takes the advantage of the change of the angle of Faraday rotation with the magnetic field, a common deficiency of the unsaturated type optical isolator, in favorably modifying the position, dimension, and characteristics of the magnetic yoke, magnetic sleeve, or magnet.

An optical isolator assembly (a combination of a magneto-optical element and a polarizer or polarizers) that constitutes a part of an optical isolator may be directly bonded to an end face of an optical fiber. The bonding requires meticulous care, and therefore the element is located, wherever possible, close to the end face of the fiber through an air layer provided in between. Since the light emitted from the optical fiber spreads fanwise, the thinner the air layer the smaller can be the diameter of the light beam that passes through the optical isolator assembly. For this purpose the end portion of the ferrule is reduced in diameter and brought close to the optical isolator assembly disposed inside a cylindrical magnet. This permits size reduction of the optical isolator assembly and shortening the length l from the end face of the fiber and the front end of the optical isolator (see FIG. 7). The lens combination system becomes easier to design as the l shortens. The optical isolator assembly is formed as a rectangular plate which looks rectangular as it is seen from the direction in which light travels, with the light-transmitting plane of polarization set in agreement with one side of the rectangle. This makes the plane of polarization definite and convenient for the element to assemble and mark. Conventional elements are round or regular square in shape which does not make the plane of polarization discernible.

An ideal example of assembling an optical fiber terminal fitted with an optical isolator will now be explained.

To begin with, an optical fiber terminal fitted with an optical isolator assembly is divided into two parts, each as an integral structure.

One is an optical fiber element unit integrally combining an optical isolator assembly and an optical fiber, and the other is a magnetic field generation unit.

The optical fiber element unit is built up of an optical fiber, a ferrule holding the fiber, an optical isolator assembly, and a stainless steel member integrally holding them together. Desirably, this optical fiber element unit, excepting the magneto-optical element, is formed entirely of nonmagnetic materials.

The magnetic field generation unit comprises a cylindrical magnet whose direction of magnetization is the axial direction thereof, a cylindrical soft-magnetic sleeve fitted around the magnet, and a soft-magnetic annular magnetic yoke disposed substantially in contact with the front end of the cylindrical magnet, away from the cylindrical soft-magnetic sleeve.

A plurality of the magnetic field generation units are prepared and the magnetic field in the position where a magneto-optical element is to be located is determined in advance. The optical fiber element unit and the selected magnetic field generation unit are tentatively assembled together. The optical characteristic (actually, the peak wavelength, or the wavelength at which the isolation is maximum) of the tentative assembly is determined. If any deviation from target characteristic is found, the optimum magnetic field is calculated from the deviation, and the magnetic field generation unit is replaced with another generation unit that meets the optimum magnetic field requirement and the new generation unit is incorporated and set permanently. Since the optical characteristic depends on the magnitude of the magnetic field (e.g., the peak wavelength varies in proportion to the magnitude of the magnetic field), the adjustment is easy.

The above-mentioned technique of Patent Application No. Hei 3-354071 involves adjustments of the shape and thickness of an annular magnetic yoke. The technique posed problems that the change in the magnetic field with a change in shape is variable is difficult to adjust and that the range of adjustment is limited. The present method overcomes those problems with ease of adjustment.

Next, it is desired that the magnetic field generation unit that comprises the cylindrical magnet whose direction of magnetization is its axial direction, a cylindrical soft-magnetic sleeve located around the magnet, and a soft-magnetic annular magnetic yoke provided substantially in contact with the front end of the cylindrical magnet, away from the cylindrical soft-magnetic sleeve, have dimensional relations among its components fixed as:

$$L/D_{in} > 0.5 D_{out}/D_{in} + 0.26$$

where L is the length of the magnet,
  D$_{in}$ is the inside diameter of the magnet, and
  D$_{out}$ is the outside diameter of the magnet.

These dimensional relations make magnetization of the region of magneto-optical element including the light beam substantially constant.

The above formula defines a range in which the external magnetic field is made larger in the vicinity of the center of the magneto-optical element, where normally the demagnetizing field of the element itself is large, than in the periphery. This defeats the demagnetizing field and external magnetic field distributions, bringing substantially uniform magnetization.

EXAMPLE 1

Figure 1:
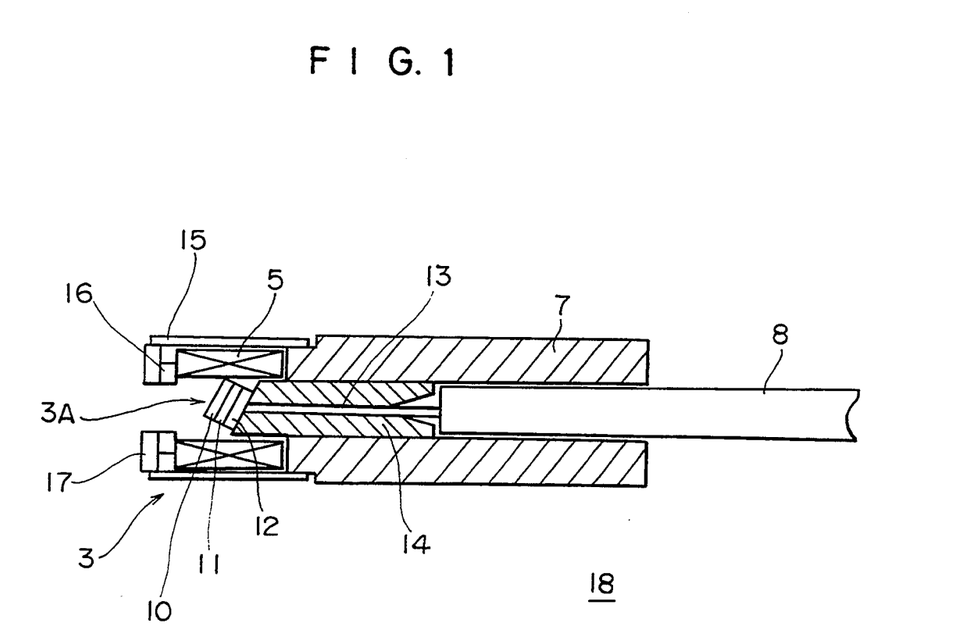
FIG. 1 is a sectional view of an optical fiber terminal fitted with an optical isolator as the first embodiment of the present invention.

Now, in conjunction with FIG. 1, an optical fiber terminal 18 fitted with an optical isolator as the first embodiment of the invention will be described in detail. Referring to FIG. 1, a length of optical fiber 8 is fixedly supported at one end in the hollow of a cylindrical ferrule 7 and has an optical isolator 3 attached to its tip. If at least a portion of the ferrule close to the optical isolator is made of a soft-magnetic material, the ferrule would achieve a sufficient magnetic shielding effect to permit the use of a smaller optical isolator. The bare part 13 of the optical fiber 8 is fitly secured in the bore of a glass tube 14 which, in turn, is supported by the ferrule 7. The tip of the bare part 13 is ground obliquely and flush with the end of the glass tube 14 to form a slanted end face together. To this end face is joined an optical isolator assembly 3A which is a sandwich consisting of a polarizer 12, magneto-optical element 11, and another polarizer 10. The optical isolation element 3A is formed as a rectangular plate which looks rectangular as it is seen from the direction in which light travels, with the light-transmitting plane of polarization set in agreement with one side of the rectangle. This makes the plane of polarization definite and convenient for the element to assemble and mark. Conventional elements are round or regular square in shape which does not make the plane of polarization discernible. In the embodiment being described, the polarizer 10 may be omitted where the laser diode as the light source (not shown) produces linearly polarized light. Joining the optical fiber and optical isolator integrally as shown fixes the position of light incidence and emergence relative to the optical isolator and the diameter of the beam. It is no longer necessary to consider the local uniformity of characteristics; the characteristics of the optical isolator have only to be optimized after the integral joining. The ferrule 7 is reduced in circumference at the front end to form a neck, onto which a magnetic sleeve 15 of soft-magnetic material substantially equal in outside diameter to the ferrule 7 is secured by welding or other technique. In contact with, or very close to, the inner wall of the magnetic sleeve 15, there is disposed a cylindrical magnet 5 whose direction of magnetization is its axial direction, surrounding the sandwich consisting of the polarizers 10, 12 and magneto-optical element 11. The magnet is fixedly mounted at the inner end on the ferrule 7. An annular magnetic yoke 16 of soft-magnetic material is attached to the front end of the magnet 5, away from the magnetic sleeve 15. The magnetic yoke at the opposite end is secured to the magnetic sleeve 15 by a nonmagnetic support ring 17. The three components, i.e., the magnetic sleeve 15, magnet 5, and magnetic yoke 16, are fixed in position after the size, shape, or/and characteristics of at least one of them have been changed to suit optimumly for the characteristics and service conditions of the optical isolator.

EXAMPLE 2

Figure 4:
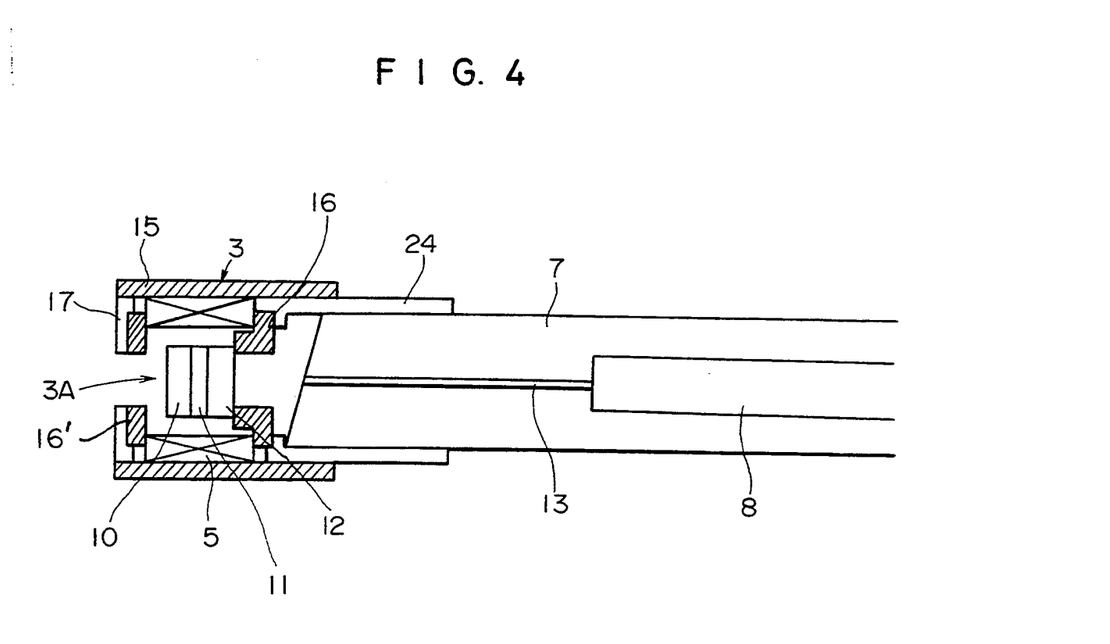
FIG. 4 is a sectional view of an optical fiber terminal fitted with an optical isolator as the second embodiment of the invention.

Next, with reference to FIG. 4, an optical fiber terminal fitted with an optical isolator as the second embodiment of the invention will be described in detail. In FIG. 4, an optical fiber 8 is shown fixedly supported in the bore of a cylindrical ferrule 7, with a connecting sleeve 24 fitted and attached by welding around the front end of the ferrule 7. The bare part 13 of the optical fiber 8 is supported in the bore of the ferrule 7 and is obliquely ground at the tip. To the connecting sleeve 24 is fixed a magnetic yoke 16 which, in turn, is joined to a sandwich of a polarizer 12, magneto-optical element (Faraday rotator) 11, and another polarizer 10. A magnetic sleeve 15 of soft-magnetic material is welded or otherwise secured to the connecting sleeve. In contact with, or very close to, the inner wall of the magnetic sleeve 15, there is disposed a cylindrical magnet 5 whose direction of magnetization is its axial direction, surrounding the sandwich consisting of the polarizers 10, 12 and magneto-optical element 11. At the front and inner ends of the magnet 5 are located annular magnetic yokes 16', 16' of soft-magnetic material, both spaced apart from the magnetic sleeve 15. The magnetic yoke 16' at the front end is fixed to the magnetic sleeve 15 by a nonmagnetic support ring 17. The yoke 16 at the inner end is held in position by the connecting sleeve 24. The connecting sleeve 24 and magnetic sleeve 15 are both made to be as small in outside diameter as possible, at most not more than twice the dimension of the ferrule.

In order to assemble the above structure, the connecting sleeve holding the inner-end magnetic yoke and isolator assembly (10, 11, 12) is fitted onto the ferrule 7 and welded together. In this way the position of light incidence and emergence relative to the optical isolator and the diameter of the beam are fixed. Then, the characteristics of the optical isolator are optimized by changing the shape characteristics of the magnet 5, yoke 16', and sleeve 15, and the components are welded in position so determined.

EXAMPLE 3

Figure 7:
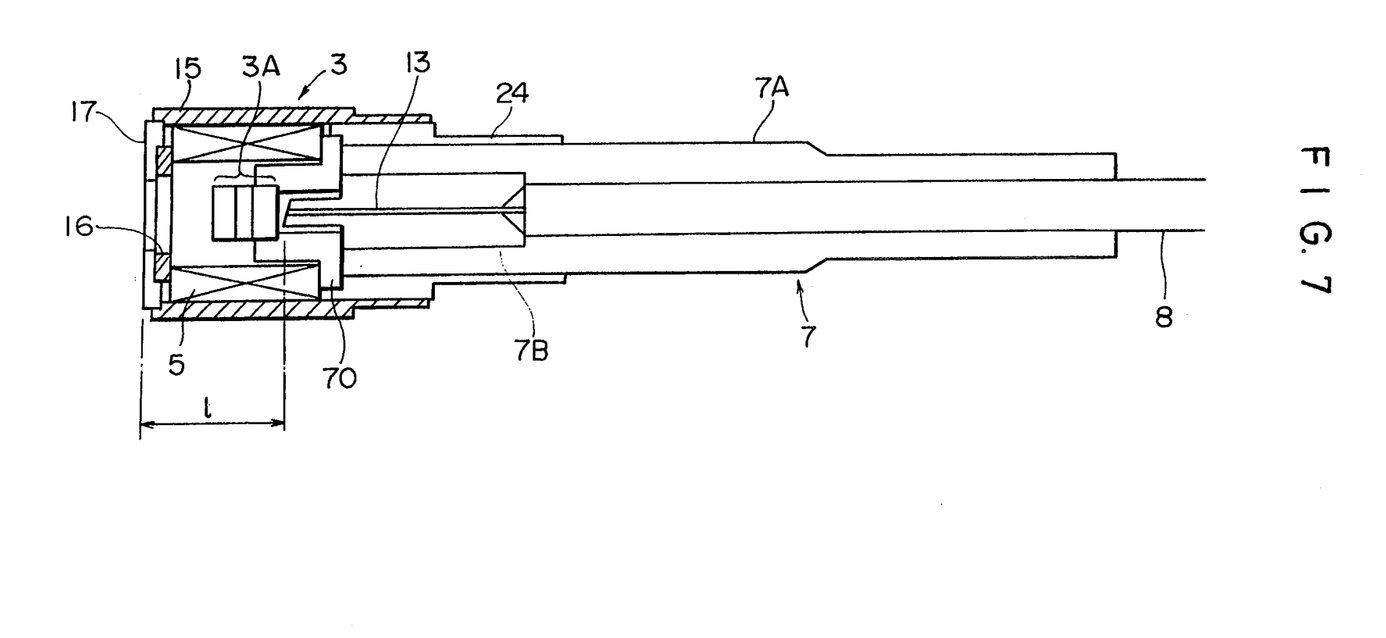
FIG. 7 is a sectional view of an optical fiber terminal fitted with an optical isolator as the third embodiment of the invention.

In connection with FIG. 7 an optical fiber terminal fitted with an optical isolator as the third embodiment of the invention will now be explained in detail. An optical fiber 8 is fixedly supported in the bore of a ferrule 7 which consists of a cylindrical tube 7A of stainless steel and a ceramic or glass capillary tube 7B press fitted in or joined to the surrounding wall of the bore of the cylinder. The bare part 13 of the optical fiber 8 is supported at the front end in the bore of a reduced-diameter part of the capillary tube 7B. The exposed end of the bare part 13 is ground obliquely and flush with the capillary tube.

An optical isolator 3 is mounted around the front end of the ferrule 7. It is mounted by first fitting and welding a connecting sleeve 24 onto the end portion of the cylindrical tube 7A. To the connecting sleeve 24 is fixed a nonmagnetic holder 70, which is connected to an optical isolator assembly 3A, or a sandwich consisting of a polarizer 12, magneto-optical element (Faraday rotator) 11, and another polarizer 10. A magnetic sleeve 15 of soft-magnetic material is welded or otherwise secured onto the connecting sleeve. In contact with, or very close to, the inner wall of the magnetic sleeve 15, there is disposed a cylindrical magnet 5 whose direction of magnetization is its axial direction so as to surround the optical isolator assembly 3A. At the front end of the magnet 5 is located an annular magnetic yoke 16 of soft-magnetic material, away from the magnetic sleeve 15. The magnetic yoke 16 at the front end is fixed to the magnetic sleeve 15 by a nonmagnetic support ring 17. The connecting sleeve 24 and magnetic sleeve 15 are both made to be as small in outside diameter as possible, at most not more than twice the dimension of the ferrule.

This embodiment is characterized in that the front end portion of the capillary tube 7B has an outside diameter smaller than the inside diameter of the holder 70 and extends close to the end face of the optical isolator assembly 3A. This eliminates the necessity of joining the optical isolator assembly 3A to the end face of the fiber, simplifying the assembling procedure. Moreover, the arrangement shortens the distance between the fiber end face and the front end of the optical isolator, rendering it easy to reduce the overall size and design a lens combination system.

To facilitate the assembling and adjustment of the optical isolator, a plurality of units each of which is a magnetic field generation unit of unitary structure consisting of a magnet 5, magnetic sleeve 15, a ring 17 for fixing by welding, and a magnetic yoke 16, are prepared beforehand. Also the magnetic field in the position where a magneto-optical element 11 is to be located is determined in advance. The selected magnetic field generation unit is tentatively assembled with an optical fiber element unit which integrally combines an optical isolator assembly 3A, isolator holder 70, connecting sleeve 24, ferrule, and optical fiber. The optical characteristic of the tentative assembly is determined. If any deviation from target characteristic is found, the optimum magnetic field is calculated from the deviation, and the magnetic field generation unit is replaced with another generation unit that meets the optimum magnetic field requirement and the new generation unit is incorporated and set permanently. Thus, the assembling and adjustment of an optical isolator are made easy. While the above-mentioned method of Patent Application No. Hei 3-354071 requires the adjustments of dimensions of the magnetic yoke and the like, the present method need no such adjustment and lends itself to industrial operation for quantity production.

In this embodiment the magnetic field generation unit comprises the cylindrical magnet 5 whose direction of magnetization is its axial direction, a cylindrical soft-magnetic sleeve 15 located around the magnet substantially in contact with its outer periphery, and a soft-magnetic annular magnetic yoke 16 provided at the front end of the cylindrical magnet 5, away from the cylindrical soft-magnetic sleeve 15. The magnetization of the region of magneto-optical element including the light beam becomes substantially constant when the dimensional relations among these components are fixed as:

$$L/D_{in} > 0.5 \times D_{out}/D_{in} + 0.16$$

where L is the length of the magnet,
$D_{in}$ is the inside diameter of the magnet, and
$D_{out}$ is the outside diameter of the magnet.

With the construction described, the ferrule 7 and the optical isolator 3 do not differ appreciably in diameter. Consequently, the optical fiber terminal fitted with this optical isolator is small in size and can be set in a desired apparatus with great ease.

Figure 3:
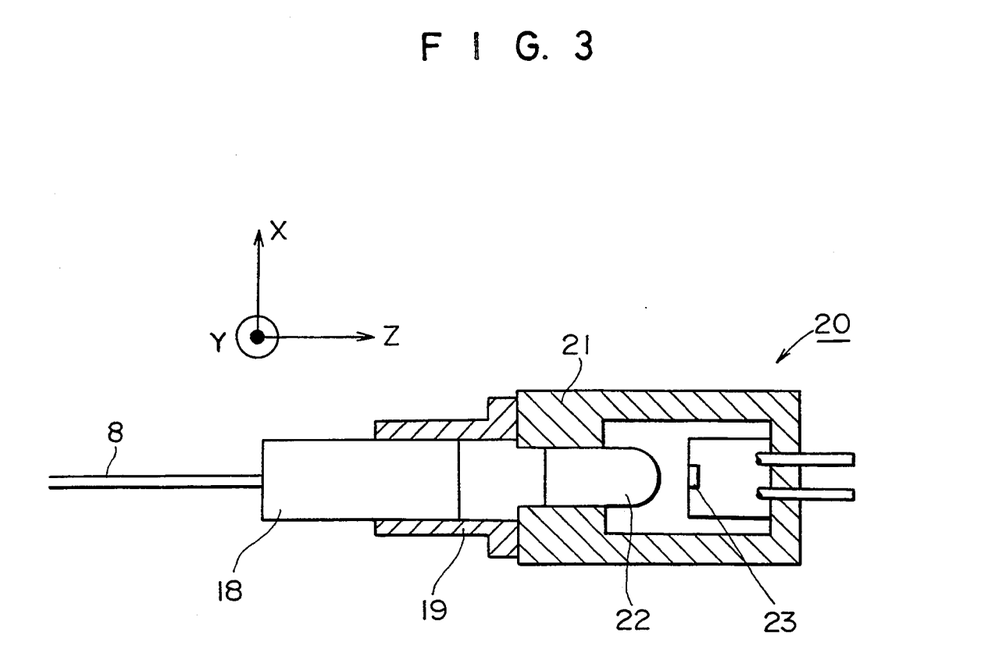
FIG. 3 is a sectional view of a laser module using an optical fiber terminal fitted with an optical isolator as the first embodiment of the invention.

By way of example, incorporation of the optical fiber terminal fitted with the optical isolator of Example 1 into a semiconductor laser module shown in FIG. 3 will now be explained. The semiconductor laser module 20 comprises a cylindrical lens holder 21 containing a laser diode tip 23 and a spherical-end rod lens 22. The optical fiber terminal 18 fitted with the optical isolator is fixed to the front end of the lens holder through a cylindrical ferrule holder 19. In assembling this module, the adjustment in the axial direction (the Z direction) of the optical fiber terminal 18 fitted with the optical isolator is made by adjusting the depth of insertion of the ferrule 7 into the ferrule holder 19. The adjustment in the radial direction (the X-Y direction) is made by adjusting the mounting position of the ferrule relative to the lens holder 21. The fixing at the adjusted position is done, e.g., by spot welding.

Figure 5:
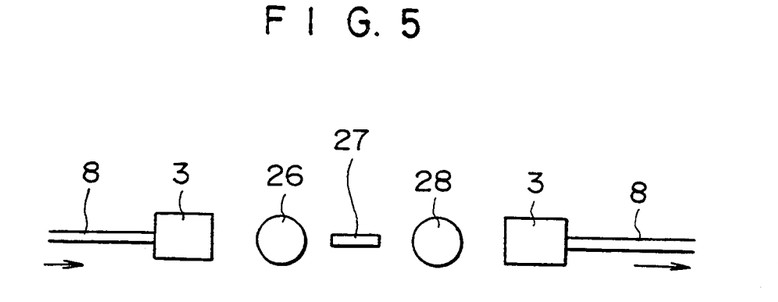
FIG. 5 is a sectional view of a laser amplifier using an optical fiber terminal fitted with an optical isolator as the second embodiment of the invention.

One of the important applications of the invention other than the semiconductor module is an optical amplifier as illustrated in FIG. 5.

Figure 6:
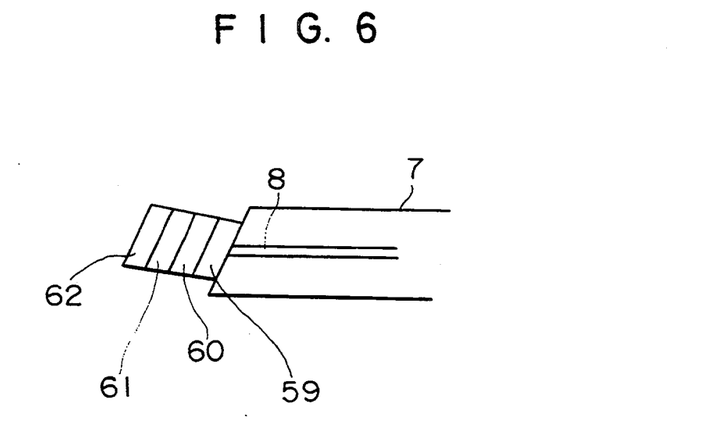
FIG. 6 is a sectional view of the essential parts of an optical fiber terminal fitted with a polarization-independent isolator in the amplifier of FIG. 5.

A semiconductor laser chip 27 shown performs the optical amplification. To couple the chip with two lengths of optical fiber 8, 8, pairs of lenses 26, 26 and optical isolators 3, 3 are used. The optical isolators are needed to reduce the reflection at the end faces of the optical fibers. As FIG. 6 shows, polarization-independent isolators 3, 3 (which allow incident light of whatever polarization to pass through in one direction but do not allow the return light to pass in the other direction) are fixed, one for each, to the ends of the optical fibers 8, 8. Typically, each isolator 3 comprises, as shown in FIG. 6, a birefringence plate 59, ½-wavelength plate 60, Faraday rotator 61, and another birefringence plate 62. Although not shown, the other components are like those shown in FIG. 1. The characteristics are adjusted with the magnetic yoke, magnet, and magnetic sleeve before being set permanently. The polarization-independent optical isolators need no alignment with polarization planes in respect of angle when they are to be joined integrally with other elements. Hence they make the assembling work simpler.

As described above, when once an unsaturated type optical isolator is joined integrally with an optical fiber, the position of light incident upon the optical isolator and the diameter of the beam are fixed. There is no necessity of considering the uniformity of magnetic field and other characteristics, a problem for the prior art. Size reduction, therefore, is made possible. The isolator according to the present invention, which has an outside diameter equal to or only slightly different from that of the ferrule on an optical fiber, can be easily handled when it is incorporated in a semiconductor laser module, optical amplifier, or the like. It is merely necessary to insert an optical fiber terminal fitted with an optical isolator into the body of the host system, have a ferrule to which it is connected held by a proper ferrule holder, and, after desired adjustments, fix them together by welding or other joining means. There is no need of the assembling and adjustment between the optical fiber and the optical isolator that are usually required. The problems of the prior art can, therefore, be settled.

Desirably, the front end portion of the ferrule is reduced in diameter, and the end face of the optical fiber is located close to the end face of the optical isolator assembly, with a thin air layer provided therebetween. In this way the overall size can be reduced, the distance between the opposing ends of the fiber and optical isolator shortened, and the lens combination system made easy to design.

It is further possible to prepare in advance a plurality of magnetic field generation units in accordance with the invention, determine their magnetic fields, changing the combination of the individual generation units with respect to a given optical isolator assembly, and then make necessary adjustments, without the need of such adjustment as the grinding of the magnetic yoke, to assemble a desired optical isolator.

What is claimed is:

1. An optical fiber terminal fitted with an optical isolator which comprises:
   an optical fiber;
   a ferrule which holds the optical fiber in position; and
   an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, wherein said means for applying a magnetic field of less than that for saturation to said magneto-optical element comprises a cylindrical magnet whose direction of magnetization is the axial direction thereof, a cylindrical soft-magnetic sleeve fitted around the magnet, and at least one soft-magnetic annular magnetic yoke disposed substantially in contact with at least the front end of the cylindrical magnet, away from the cylindrical soft-magnetic sleeve.

2. An optical fiber terminal fitted with an optical isolator which comprises:

an optical fiber:

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, wherein said ferrule has a front end portion reduced in diameter from the remainder of the ferrule and is in contact at the front end thereof with said optical isolator assembly.

3. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally wherein said ferrule has a front end portion reduced in diameter from the remainder of the ferrule, the front end thereof being located proximate to said optical isolator assembly, with an air layer provided therebetween.

4. An optical fiber terminal fitted with an optical isolator which comprises:

an optical fiber:

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, wherein said optical isolator assembly is formed as a rectangular plate which looks rectangular as seen from the direction in which light travels, with a light-transmitting plane of polarization of the plate being set in agreement with one side of the rectangle.

5. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, wherein said means for applying a magnetic field of less than that for saturation to said magneto-optical element further comprises a magnetic field generation unit comprising a cylindrical magnet whose direction of magnetization is the axial direction thereof, a cylindrical soft-magnetic sleeve fitted around the magnet, and at least one soft-magnetic annular magnetic yoke disposed substantially in contact with at least the front end of the cylindrical magnet, away from the cylindrical soft-magnetic sleeve, wherein the magnetic field generation unit has dimensional relations among the components thereof fixed from the formula:

$$L/D_{in} > 0.5 \times D_{out}/D_{in} + 0.16$$

where L is the length of the magnet, $D_{in}$ is the inside diameter of the magnet, and $D_{out}$ is the outside diameter of the magnet.

6. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, which is used in a semiconductor laser module.

7. An optical fiber terminal fitted with an optical isolator which comprises;

an optical fiber:

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, which is used in an optical amplifier module.

8. A method of assembling an optical isolator which comprises preparing in advance a plurality of magnetic field generation units each consisting of a cylindrical magnet whose direction of magnetization is the axial direction thereof, a cylindrical soft-magnetic sleeve fitted around the magnet, and a soft-magnetic annular magnetic yoke provided substantially in contact with the front end of the cylindrical magnet, away from the cylindrical soft-magnetic sleeve, determining beforehand the magnetic field in the position where a magneto-optical element is to be located, tentatively assembling a selected one of said magnetic field generation units with an integral combination of an optical isolator assembly and an optical fiber, determining the optical characteristic of the tentative assembly, calculating the optimum magnetic field from any deviation that might arise from target characteristic, replacing the magnetic field generation unit with another generation unit that meets the optimum magnetic field requirement, and thereafter incorporating the new generation unit and fixing the same permanently in the final assembly.

9. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, wherein said means for applying a magnetic field of less than that for saturation to said magneto-optical element comprises a cylindrical magnet whose direction of magnetization is the axial direction thereof, a cylindrical soft-magnetic sleeve fitted around the magnet, and at least one soft-magnetic annular magnetic yoke disposed substantially in contact with at least the front end of the cylindrical magnet, away from the cylindrical soft-magnetic sleeve.

10. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, wherein said ferrule has a front end portion reduced in diameter from the remainder of the ferrule and is in contact at the front end thereof with said optical isolator assembly.

11. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, wherein said ferrule has a front end portion reduced in diameter from the remainder of the ferrule, the front end thereof being located proximate to said optical isolator assembly, with an air layer provided therebetween.

12. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, wherein said optical isolator assembly is formed as a rectangular plate which looks rectangular as seen from the direction in which light travels, with a light-transmitting plane of polarization of the plate being set in agreement with one side of the rectangle.

13. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, wherein said means for applying a magnetic field of less than that for saturation to the magneto-optical element further comprises a magnetic field generation unit comprising a cylindrical magnet whose direction of magnetization is the axial direction thereof, a cylindrical soft-magnetic sleeve fitted around the magnet, and a soft-magnetic annular magnetic yoke provided substantially in contact with the front end of the cylindrical magnet, away from the cylindrical soft-magnetic sleeve, wherein the magnetic field generation unit has dimensional relations among the components thereof fixed from the formula:

$$L/Din > 0.5 \times Dout/Din + 0.16$$

where L is the length of the magnet,

Din is the inside diameter of the magnet, and

Dout is the outside diameter of the magnet.

14. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, which is used in a semiconductor laser module.

15. An optical fiber terminal fitted with an optical isolator which comprises:

an optical fiber;

a ferrule which holds the optical fiber in position; and an optical isolator which includes an optical isolator assembly having at least one magneto-optical element and at least one polarizer and means for applying a magnetic field of less than that for saturation to the magneto-optical element;

said fiber, ferrule, and isolator being disposed proximate to one another and joined integrally, said optical isolator having a maximum outside diameter not more than twice the outside diameter of said ferrule, which is used in an optical amplifier module.

* * * * *